United States Patent
Gonze et al.

(10) Patent No.: US 8,105,417 B2
(45) Date of Patent: Jan. 31, 2012

(54) FACE CRACK REDUCTION STRATEGY FOR PARTICULATE FILTERS

(75) Inventors: Eugene V. Gonze, Pinckney, MI (US); Michael J. Paratore, Jr., Howell, MI (US); Garima Bhatia, Bangalore (IN)

(73) Assignee: GM Global Technology Operations LLC

( * ) Notice: Subject to any disclaimer, the term of this patent is extended or adjusted under 35 U.S.C. 154(b) by 813 days.

(21) Appl. No.: 12/019,980

(22) Filed: Jan. 25, 2008

(65) Prior Publication Data
US 2009/0071127 A1    Mar. 19, 2009

Related U.S. Application Data

(60) Provisional application No. 60/972,517, filed on Sep. 14, 2007.

(51) Int. Cl.
*B01D 46/00* (2006.01)

(52) U.S. Cl. .......... 95/18; 95/278; 95/283; 96/420; 55/282.3; 55/283; 55/523; 55/DIG. 10; 55/DIG. 30; 60/311

(58) Field of Classification Search .......... 95/14–18, 95/283, 278; 55/522–524, DIG. 10, DIG. 30, 55/282.3, 283; 422/168, 172–180; 60/286, 60/311, 273, 277, 295, 297, 320; 96/420

See application file for complete search history.

(56) References Cited

U.S. PATENT DOCUMENTS

| 5,203,166 | A | | 4/1993 | Miller |
| 6,090,172 | A | * | 7/2000 | Dementhon et al. ......... 55/282.3 |
| 6,176,896 | B1 | * | 1/2001 | Dementhon et al. ............. 95/14 |
| 2004/0000139 | A1 | * | 1/2004 | Kawashima et al. ........... 60/295 |
| 2004/0161373 | A1 | * | 8/2004 | Ichikawa et al. ............. 422/180 |

OTHER PUBLICATIONS

U.S. Appl. No. 11/959,723, filed Dec. 19, 2007, Eugene Gonze.
U.S. Appl. No. 11/956,722, filed Dec. 14, 2007, Eugene Gonze.
U.S. Appl. No. 11/561,100, filed Nov. 17, 2006, Eugene Gonze.
U.S. Appl. No. 11/557,715, filed Nov. 8, 2006, Eugene Gonze.

* cited by examiner

*Primary Examiner* — Duane Smith
*Assistant Examiner* — Karla Hawkins (57) ABSTRACT

A system comprises a particulate matter (PM) filter that comprises an upstream end for receiving exhaust gas, a downstream end and at least one portion. A control module initiates combustion of PM in the PM filter using a heater and selectively adjusts oxygen levels of the exhaust gas to adjust a temperature of combustion adjacent to the at least one portion of the PM filter. A method comprises providing a particulate matter (PM) filter that comprises an upstream end for receiving exhaust gas, a downstream end and at least one portion; initiating combustion of PM in the PM filter using a heater; selectively adjusting oxygen levels of the exhaust gas to adjust a temperature of combustion adjacent to the at least one portion of the PM filter.

24 Claims, 11 Drawing Sheets

FACE CRACK REDUCTION STRATEGY FOR PARTICULATE FILTERS

CROSS-REFERENCE TO RELATED APPLICATIONS

This application claims the benefit of U.S. Provisional Patent Application No. 60/972,517, filed on Sep. 14, 2007.

STATEMENT OF GOVERNMENT RIGHTS

This disclosure was produced pursuant to U.S. Government Contract No. DE-FC-04-03 AL67635 with the Department of Energy (DoE). The U.S. Government has certain rights in this disclosure.

This application is related to U.S. patent application Ser. No. 11/959,753 filed on Dec. 19, 2007, Ser. No. 11/956,722 filed on Dec. 14, 2007, Ser. No. 11/561,100 filed on Nov. 17, 2006, Ser. No. 11/561,108 filed on Nov. 17, 2006, and Ser. No. 11/557,715 filed on Nov. 8, 2006. The disclosures of the above applications are incorporated herein by reference in their entirety.

FIELD

The present disclosure relates to particulate matter (PM) filters, and more particularly to reducing face cracks in electrically heated PM filters.

BACKGROUND

The statements in this section merely provide background information related to the present disclosure and may not constitute prior art.

Engines such as diesel engines produce particulate matter (PM) that is filtered from exhaust gas by a PM filter. The PM filter is disposed in an exhaust system of the engine. The PM filter reduces emission of PM that is generated during combustion.

Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy. The resistive heating coils are typically arranged in contact with the PM filter to allow heating by both conduction and convection.

Diesel PM combusts when temperatures above a combustion temperature such as 600° C. are attained. The start of combustion causes a further increase in temperature. While spark-ignited engines typically have low oxygen levels in the exhaust gas stream, diesel engines have significantly higher oxygen levels. While the increased oxygen levels make fast regeneration of the PM filter possible, it may also pose some problems.

PM reduction systems that use fuel tend to decrease fuel economy. For example, many fuel-based PM reduction systems decrease fuel economy by 5%. Electrically heated PM reduction systems reduce fuel economy by a negligible amount. However, durability of the electrically heated PM reduction systems has been difficult to achieve.

Face cracks have been an issue with the electrically heated PM filters. These cracks are created by large thermal expansion forces generated by the burning soot near a rear endplug region of the PM filter.

SUMMARY

A system comprises a particulate matter (PM) filter that comprises an upstream end for receiving exhaust gas, a downstream end and at least one portion. A control module initiates combustion of PM in the PM filter using a heater and selectively adjusts oxygen levels of the exhaust gas to adjust a temperature of combustion adjacent to the at least one portion of the PM filter.

A method comprises providing a particulate matter (PM) filter that comprises an upstream end for receiving exhaust gas, a downstream end and at least one portion; heating the PM filter with a heater; initiating combustion of PM in the PM filter; selectively adjusting oxygen levels of the exhaust gas to adjust a temperature of combustion adjacent to the at least one portion of the PM filter.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure relates to zoned and unzoned heaters for PM filters. The electrical heater may be in contact with or spaced from the PM filter. The heater selectively heats all or portions of the PM filter. The PM filter may be in contact with or mounted close enough to the front of the PM filter to control the heating pattern. The length of the heater may be set to optimize the exhaust gas temperature.

Thermal energy is transmitted from the heater to the PM filter. The PM filter may be heated by convection and/or conduction. The electrical heater may be divided in zones to reduce electrical power required to heat the PM filter. The zones also heat selected downstream portions within the PM filter. By heating only the selected portions of the filter, the magnitude of forces in the substrate is reduced due to thermal expansion. As a result, higher localized soot temperatures may be used during regeneration without damaging the PM filter.

The PM filter may be regenerated by selectively heating one or more of the zones in the front of the PM filter and igniting the soot using the heated exhaust gas. When a sufficient face temperature is reached, the heater may be turned off and the burning soot then cascades down the length of the PM filter channel, which is similar to a burning fuse on a firework.

In other words, the heater may be activated only long enough to start the soot ignition and is then shut off. Other regeneration systems typically use both conduction and convection and maintain power to the heater (at lower temperatures such as 600 degrees Celsius) throughout the soot burning process. As a result, these systems tend to use more power than the system proposed in the present disclaimer.

The burning soot is the fuel that continues the regeneration. This process is continued for each heating zone until the PM filter is completely regenerated.

The present disclosure uses a control strategy that is designed to limit thermal stress by reducing the temperature of combustion as the cascading flamefront nears selected portions of the PM filter. The basic electrically heated PM filter strategy is to maximize a temperature of a burn zone for robustness and soot removal but limit the temperature in areas that are easily damaged.

The rear endplugs on the PM filter are an area where temperature control may be needed. The present disclosure reduces the temperature at the rear end plugs of the PM filter by monitoring the position of the cascading flamefront and using exhaust oxygen control to reduce the temperature when the burn zone nears the rear endplugs or other selected components.

Many techniques could be used to limit the exhaust oxygen concentration. For example only, temperature control can be achieved by injecting fuel into a hot catalyst (Post fuel), increasing EGR (Exhaust Gas Recirculation), and/or throttling the engine.

The heater zones may be spaced in a manner such that thermal stress is mitigated between active heaters. Therefore, the overall stress forces due to heating are smaller and distributed over the volume of the entire electrically heated PM filter. This approach allows regeneration in larger segments of the electrically heated PM filter without creating thermal stresses that damage the electrically heated PM filter.

A largest temperature gradient tends to occur at edges of the heaters. Therefore, activating one heater past the localized stress zone of another heater enables more actively heated regeneration volume without an increase in overall stress. This tends to improve the regeneration opportunity within a drive cycle and reduces cost and complexity since the system does not need to regenerate as many zones independently.

Figure 1:
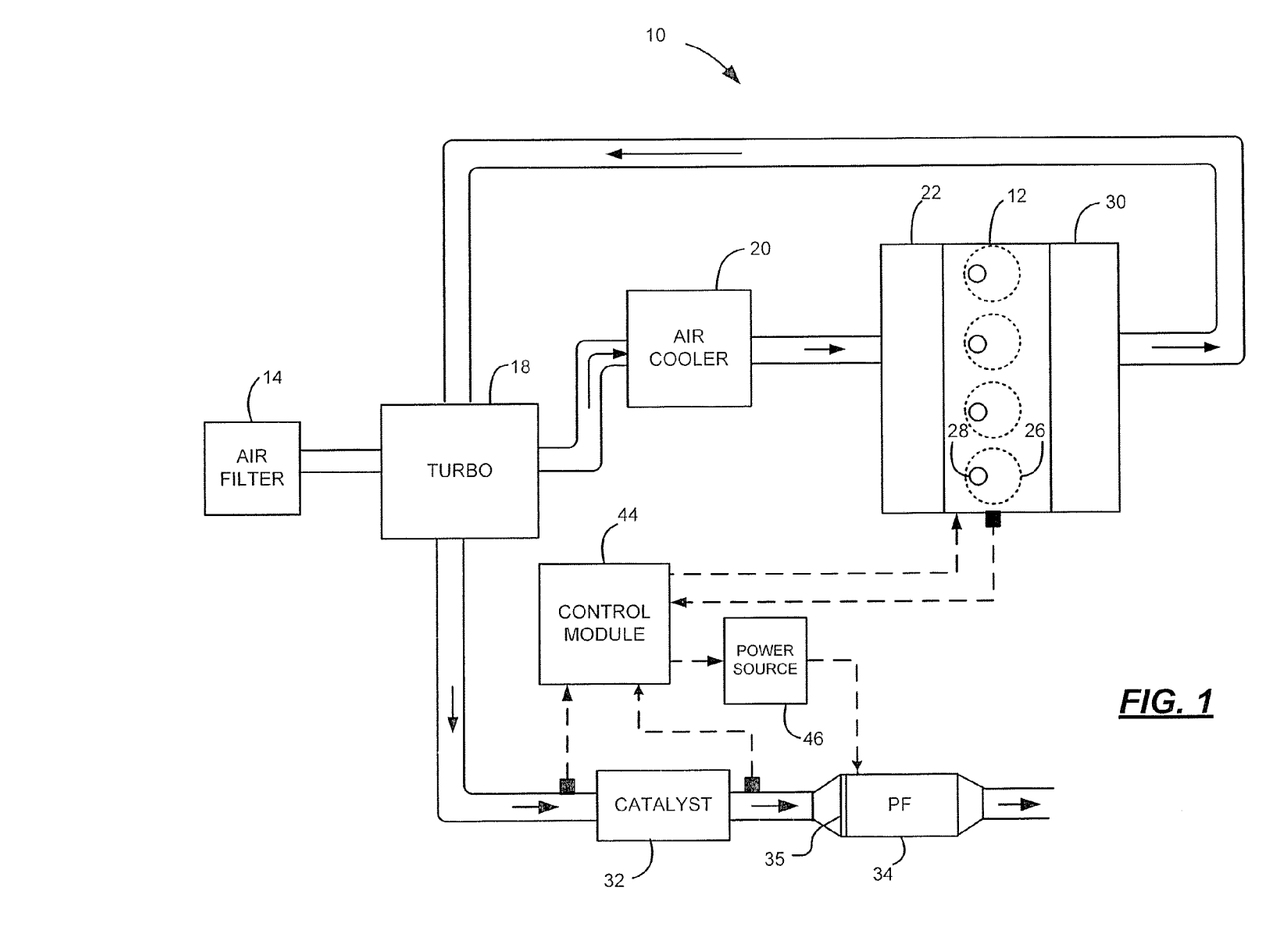
FIG. 1 is a functional block diagram of an exemplary engine including a particulate matter (PM) filter with a zoned inlet heater that is spaced from the PM filter.

Referring now to FIG. 1, an exemplary diesel engine system 10 is schematically illustrated in accordance with the present disclosure. It is appreciated that the diesel engine system 10 is merely exemplary in nature and that the zone heated particulate filter regeneration system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 10 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a V-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PM filter) assembly 34 with an inlet heater 35. The heater 35 may be zoned. Optionally, an EGR valve (not shown) recirculates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32, through the heater 35 and into the PM filter assembly 34. The DOC 32 oxidizes the exhaust based on the post combustion air/fuel ratio. The amount of oxidation increases the temperature of the exhaust. The PM filter assembly 34 receives exhaust from the DOC 32 and filters any soot particulates present in the exhaust. The inlet heater 35 is in contact with or spaced from the PM filter assembly 34 and heats the exhaust to a regeneration temperature as will be described below.

A control module 44 controls the engine and PM filter regeneration based on various sensed information. More specifically, the control module 44 estimates loading of the PM filter assembly 34. When the estimated loading is at a predetermined level and the exhaust flow rate is within a desired range, current may be controlled to the PM filter assembly 34 via a power source 46 to initiate the regeneration process. The duration of the regeneration process may be varied based upon the estimated amount of particulate matter within the PM filter assembly 34.

Current is applied to the heater 35 during the regeneration process. More specifically, the energy may heat selected zones of the heater 35 of the PM filter assembly 34 for predetermined periods, respectively. Exhaust gas passing through the heater 35 is heated by the activated zones. The heated exhaust gas travels to the downstream filter of PM filter assembly 34 and heats the filter by convection and/or conduction. The remainder of the regeneration process is achieved using the heat generated by the heated exhaust passing through the PM filter.

Figure 2:
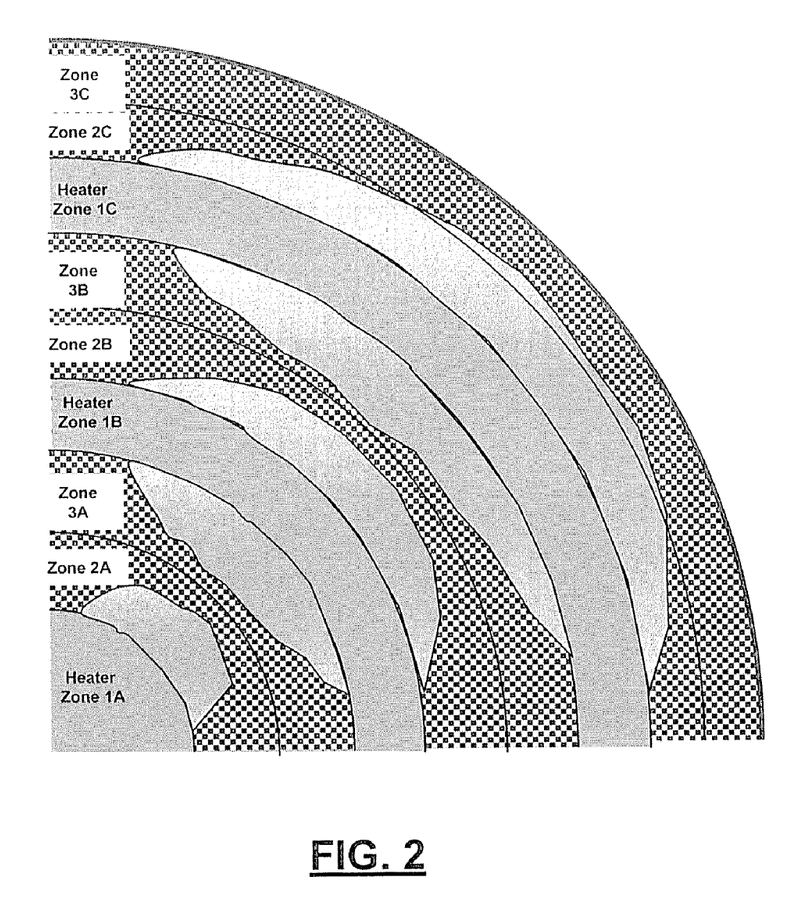
FIG. 2 illustrates exemplary zoning of the zoned inlet heater of the electrically heated particulate matter (PM) filter of FIG. 1 in further detail.

Referring now to FIG. 2, an exemplary zoned inlet heater 35 for the PM filter assembly 34 is shown in further detail. The electrically heated PM filter assembly 34 is arranged spaced from or in contact with the PM filter assembly 34. The PM filter assembly 34 includes multiple spaced heater zones including zone 1 (with sub-zones 1A, 1B and 1C), zone 2 (with sub-zones 2A, 2B and 2C) and zone 3 (with sub-zones 3A, 3B and 3C). The zones 1, 2 and 3 may be activated during different respective periods.

As exhaust gas flows through the activated zones of the heater, regeneration occurs in the corresponding portions of the PM filter that initially received the heated exhaust gas (e.g. areas downstream from the activated zones) or downstream areas that are ignited by cascading burning soot. The corresponding portions of the PM filter that are not downstream from an activated zone act as stress mitigation zones. For example in FIG. 2, sub-zones 1A, 1B and 1C are activated and sub-zones 2A, 2B, 2C, 3A, 3B, and 3C act as stress mitigation zones.

The corresponding portions of the PM filter downstream from the active heater sub-zones 1A, 1B and 1C thermally expand and contract during heating and cooling. The stress mitigation sub-zones 2A and 3A, 2B and 3B, and 2C and 3C mitigate stress caused by the expansion and contraction of the heater sub-zones 1A, 1B and 1C. After zone 1 has completed regeneration, zone 2 can be activated and zones 1 and 3 act as stress mitigation zones. After zone 2 has completed regeneration, zone 3 can be activated and zones 1 and 2 act as stress mitigation zones.

Figure 3:
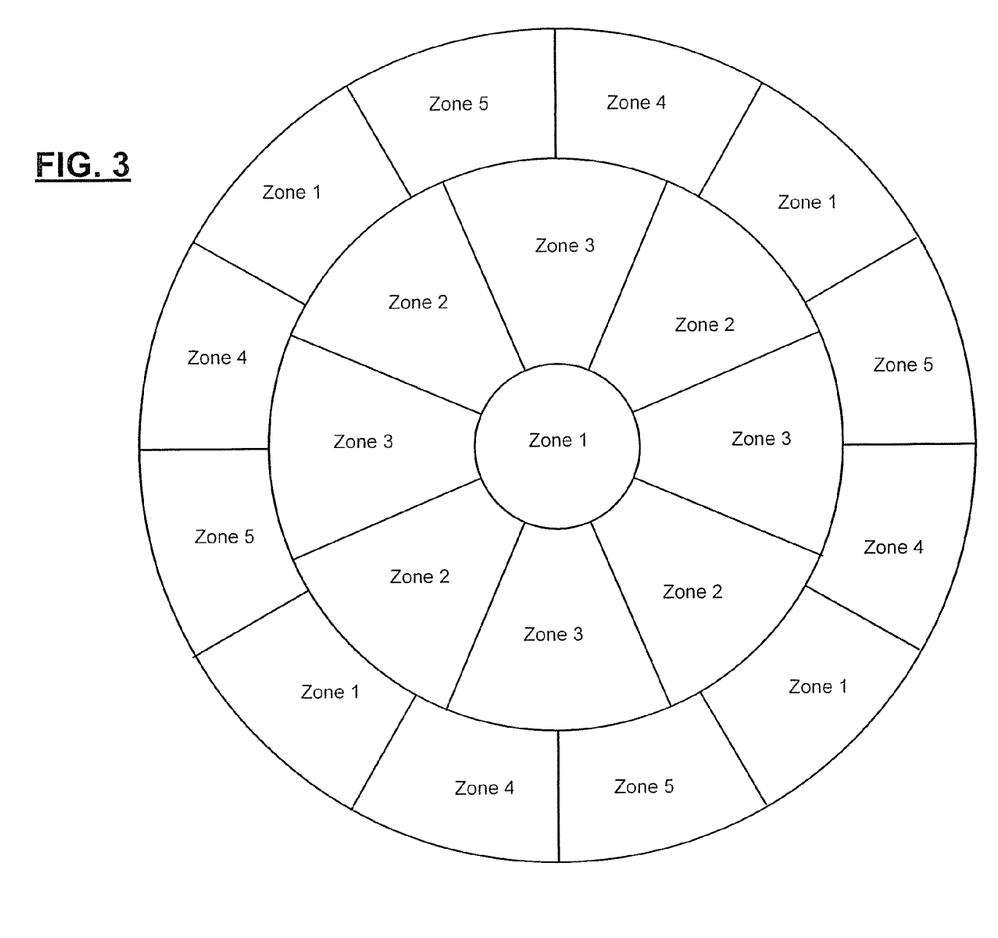
FIG. 3 illustrates exemplary zoning of the zoned inlet heater of the electrically heated PM filter of FIG. 1 in further detail.

Referring now to FIG. 3, another exemplary zoned inlet heater arrangement is shown. A center portion may be surrounded by a middle zone including a first circumferential band of zones. The middle portion may be surrounded by an outer portion including a second circumferential band of zones.

In this example, the center portion includes zone 1. The first circumferential band of zones includes zones 2 and 3. The second circumferential band of zones comprises zones 1, 4 and 5. As with the embodiment described above, downstream portions from active zones are regenerated while downstream portions from inactive zones provide stress mitigation. As can be appreciated, one of the zones 1, 2, 3, 4 and 5 can be activated at a time. Others of the zones remain inactivated.

Figure 4:
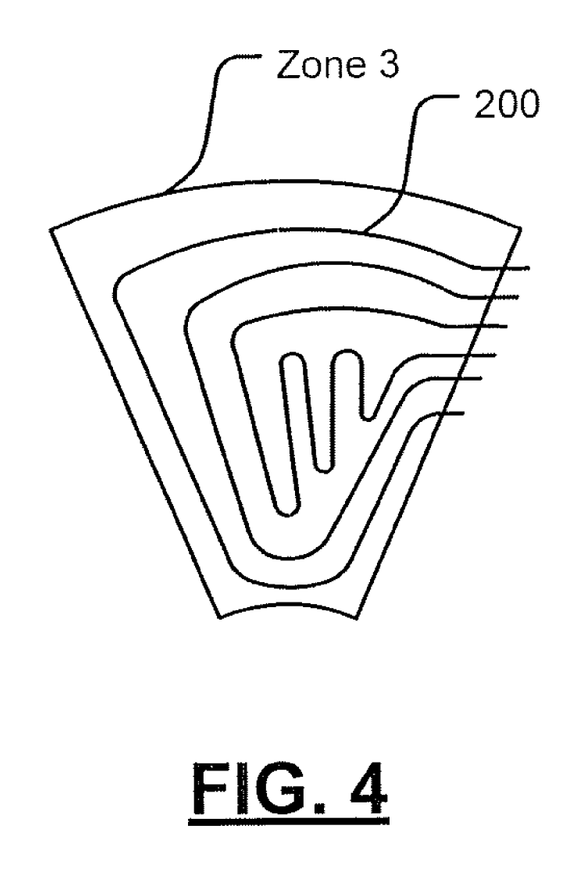
FIG. 4 illustrates an exemplary resistive heater in one of the zones of the zoned inlet heater of FIG. 3.

Referring now to FIG. 4, an exemplary resistive heater 200 arranged adjacent to one of the zones (e.g. zone 3) from the first circumferential band of zones in FIG. 3 is shown. The resistive heater 200 may comprise one or more coils that cover the respective zone to provide sufficient heating.

Figure 5:
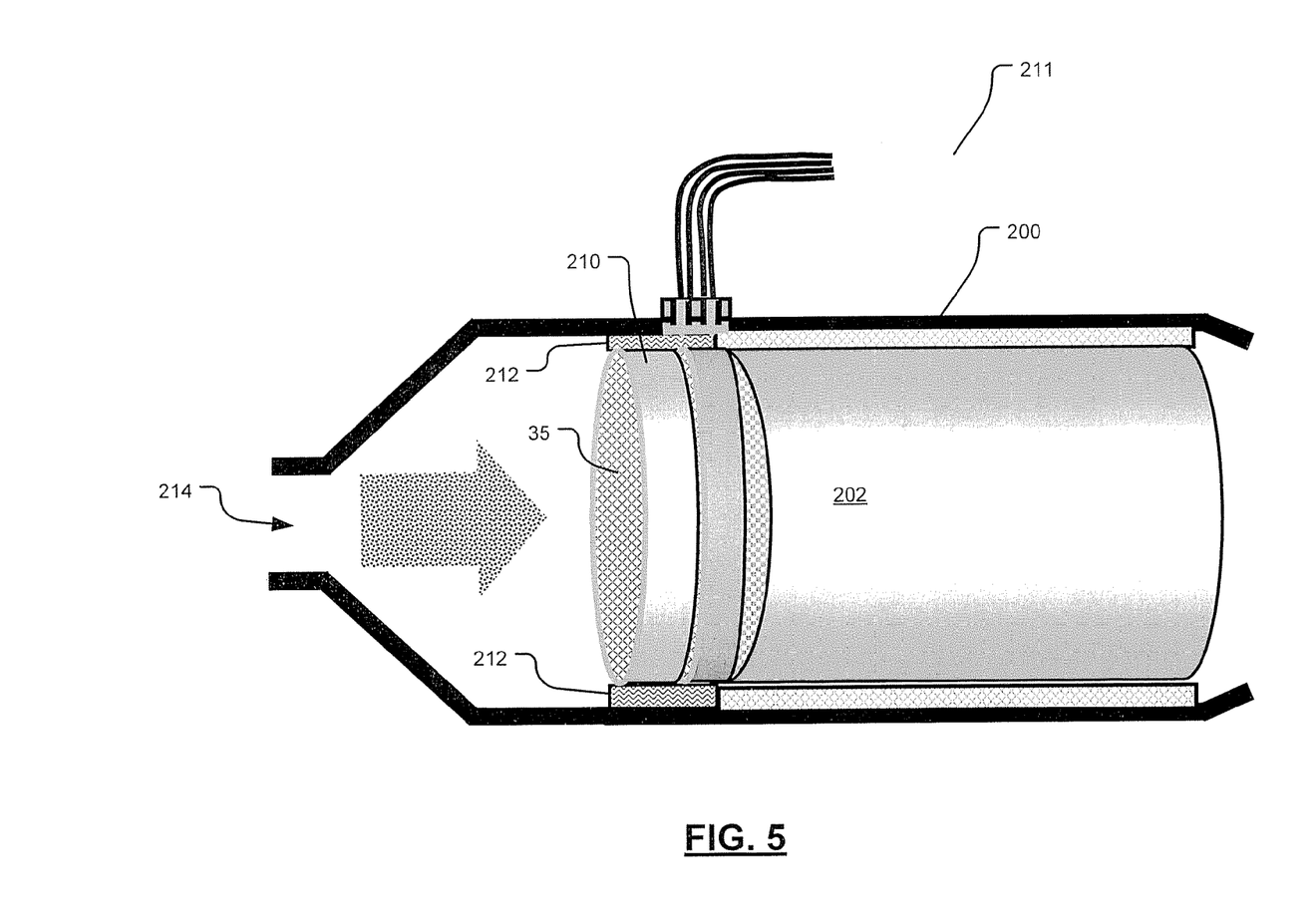
FIG. 5 illustrates the electrically heated PM filter having a zoned electric heater that is spaced from the PM filter.

Referring now to FIG. 5, the PM filter assembly 34 is shown in further detail. The PM filter assembly 34 includes a housing 200, a filter 202, and the zoned heater 35. The filter 202 may include a rear endplug 208. The heater 35 may be arranged between a laminar flow element 210 and a substrate of the filter 202. An electrical connector 211 may provide current to the zones of the PM filter assembly 34 as described above.

As can be appreciated, the heater 35 may be in contact with or spaced from the filter 202 such that the heating is convection and/or conduction heating. Insulation 212 may be arranged between the heater 35 and the housing 200. Exhaust gas enters the PM filter assembly 34 from an upstream inlet 214 and is heated by one or more zones of the PM filter assembly 34. The heated exhaust gas is received by the filter 202.

Figure 6:
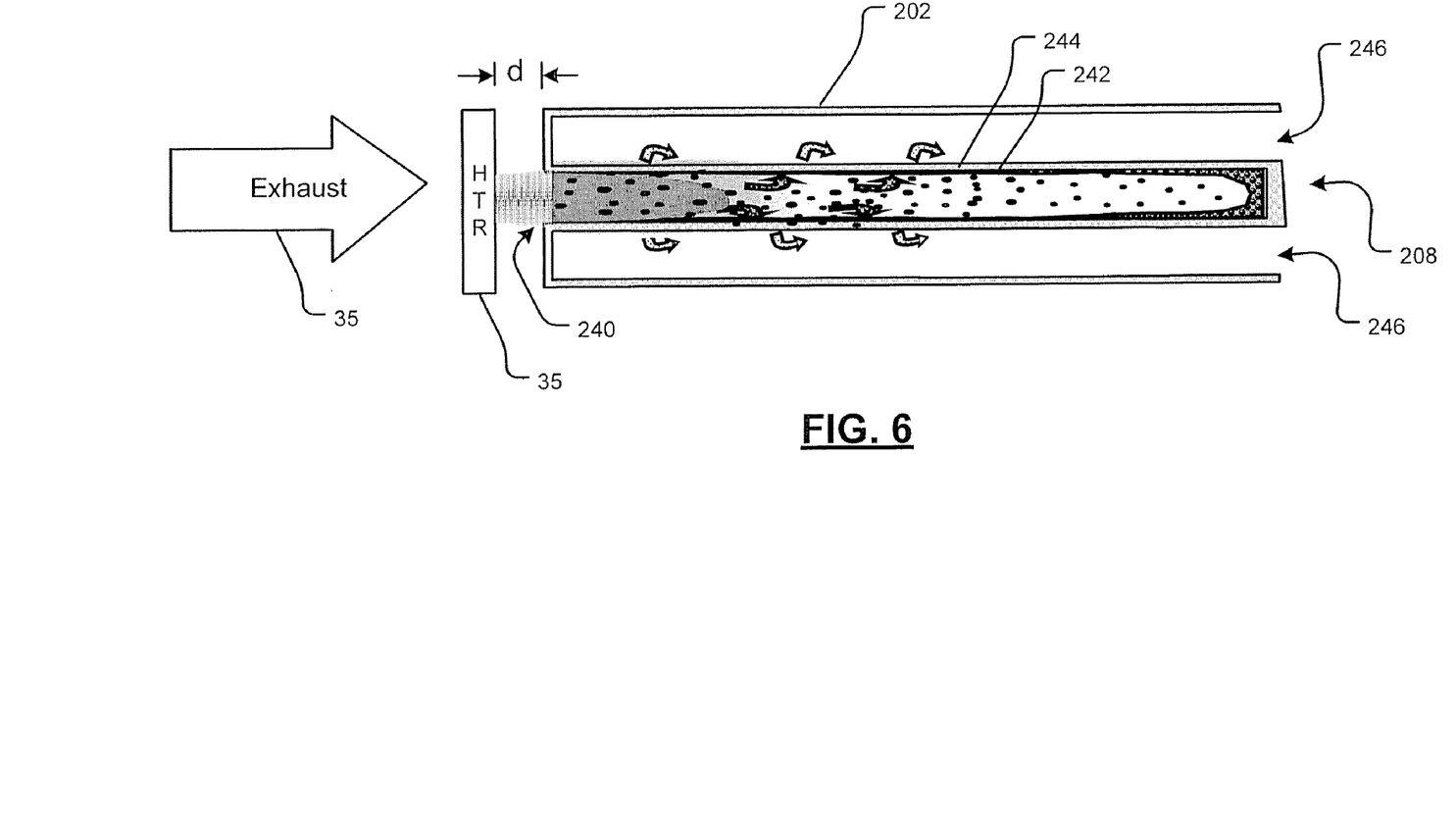
FIG. 6 illustrates heating within the zoned electric heater.

Referring now to FIG. 6, heating within the PM filter assembly 34 is shown in further detail. Exhaust gas 250 passes through the heater 35 and is heated by one or more zones of the heater 35. If spaced from the filter 202, the heated exhaust gas travels a distance "d" and is then received by the filter 202. The distance "d" may be ½" or less. The filter 202 may have a central inlet 240, a channel 242, filter material 244 and an outlet 246 located radially outside of the inlet. The filter may be catalyzed. The heated exhaust gas causes PM in the filter to burn, which regenerates the PM filter. The heater 35 transfers heat by convection and/or conduction to ignite a front portion of the filter 202. When the soot in the front face portions reaches a sufficiently high temperature, the heater is turned off. Combustion of soot then cascades down a filter channel 254 without requiring power to be maintained to the heater.

Figure 7:
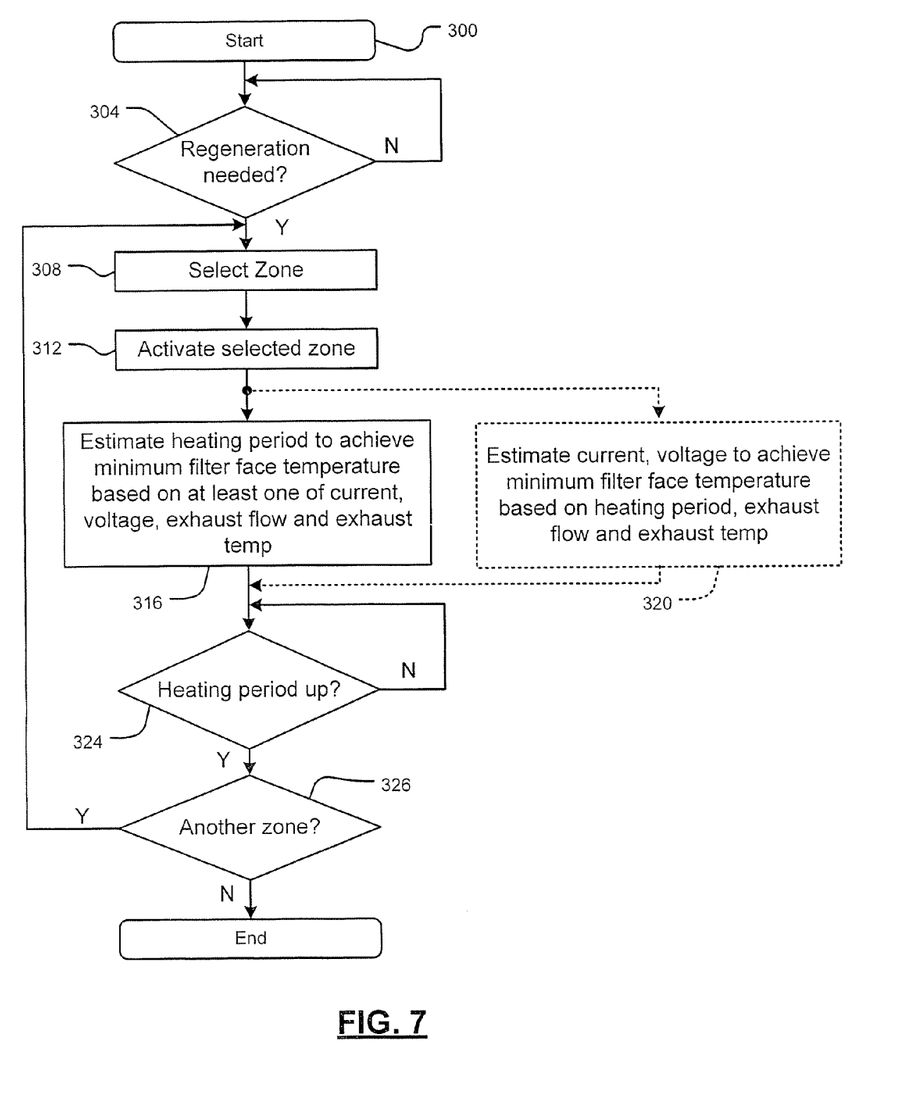
FIG. 7 is a flowchart illustrating steps performed by the control module to regenerate the PM filter.

Referring now to FIG. 7, steps for regenerating the PM filter are shown. In step 300, control begins and proceeds to step 304. If control determines that regeneration is needed in step 304, control selects one or more zones in step 308 and activates the heater for the selected zone in step 312. In step 316, control estimates a heating period sufficient to achieve a minimum filter face temperature based on at least one of current, voltage, exhaust flow and exhaust temperature. The minimum face temperature should be sufficient to start the soot burning and to create a cascade effect. For example only, the minimum face temperature may be set to 700 degrees Celsius or greater. In an alternate step 320 to step 316, control estimates current and voltage needed to achieve minimum filter face temperature based on a predetermined heating period, exhaust flow and exhaust temperature.

In step 324, control determines whether the heating period is up. If step 324 is true, control determines whether additional zones need to be regenerated in step 326. If step 326 is true, control returns to step 308. Otherwise control ends.

In use, the control module determines when the PM filter requires regeneration. Alternately, regeneration can be performed periodically or on an event basis. The control module may estimate when the entire PM filter needs regeneration or when zones within the PM filter need regeneration. When the control module determines that the entire PM filter needs regeneration, the control module sequentially activates one or more of the zones at a time to initiate regeneration within the associated downstream portion of the PM filter. After the zone or zones are regenerated, one or more other zones are activated while the others are deactivated. This approach continues until all of the zones have been activated. When the control module determines that one of the zones needs regeneration, the control module activates the zone corresponding to the associated downstream portion of the PM filter needing regeneration.

The present disclosure may substantially reduce the fuel economy penalty, decrease tailpipe temperatures, and improve system robustness due to the smaller regeneration time.

Figure 8:
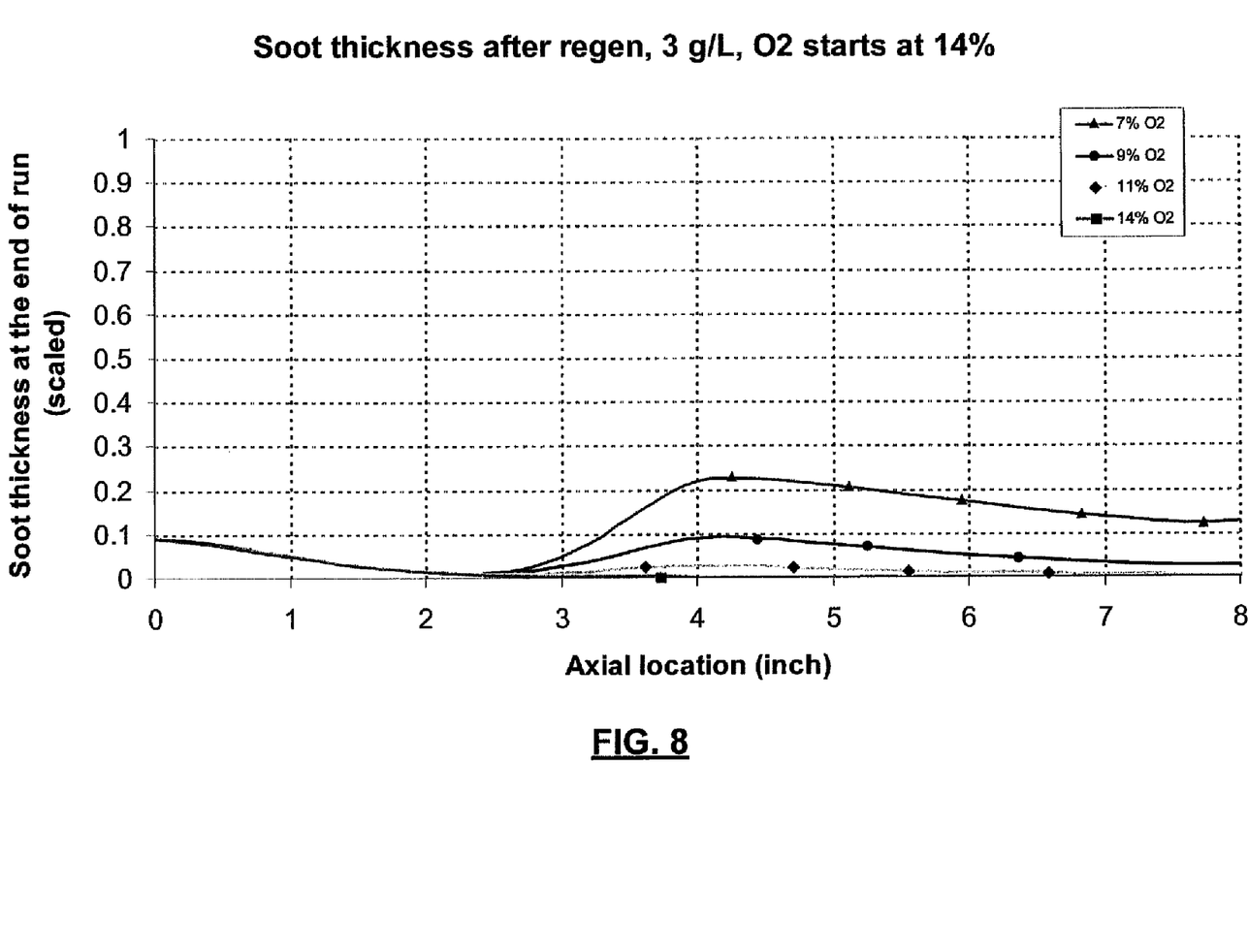
FIG. 8 is a graph illustrating soot thickness as a function of axial location for various oxygen levels.

Referring now to FIG. 8, soot thickness is shown as a function of axial location for various oxygen levels. As can be appreciated, there is a tradeoff between soot thickness and oxygen levels. As the oxygen level increases (from 7% to 9% to 11% to 14%), the soot thickness after regeneration decreases. However, soot levels are reduced greater than 50% more at 9% as compared to 7%. Likewise, soot levels are reduced greater than 50% more at 11% as compared to 9%.

Figure 9:
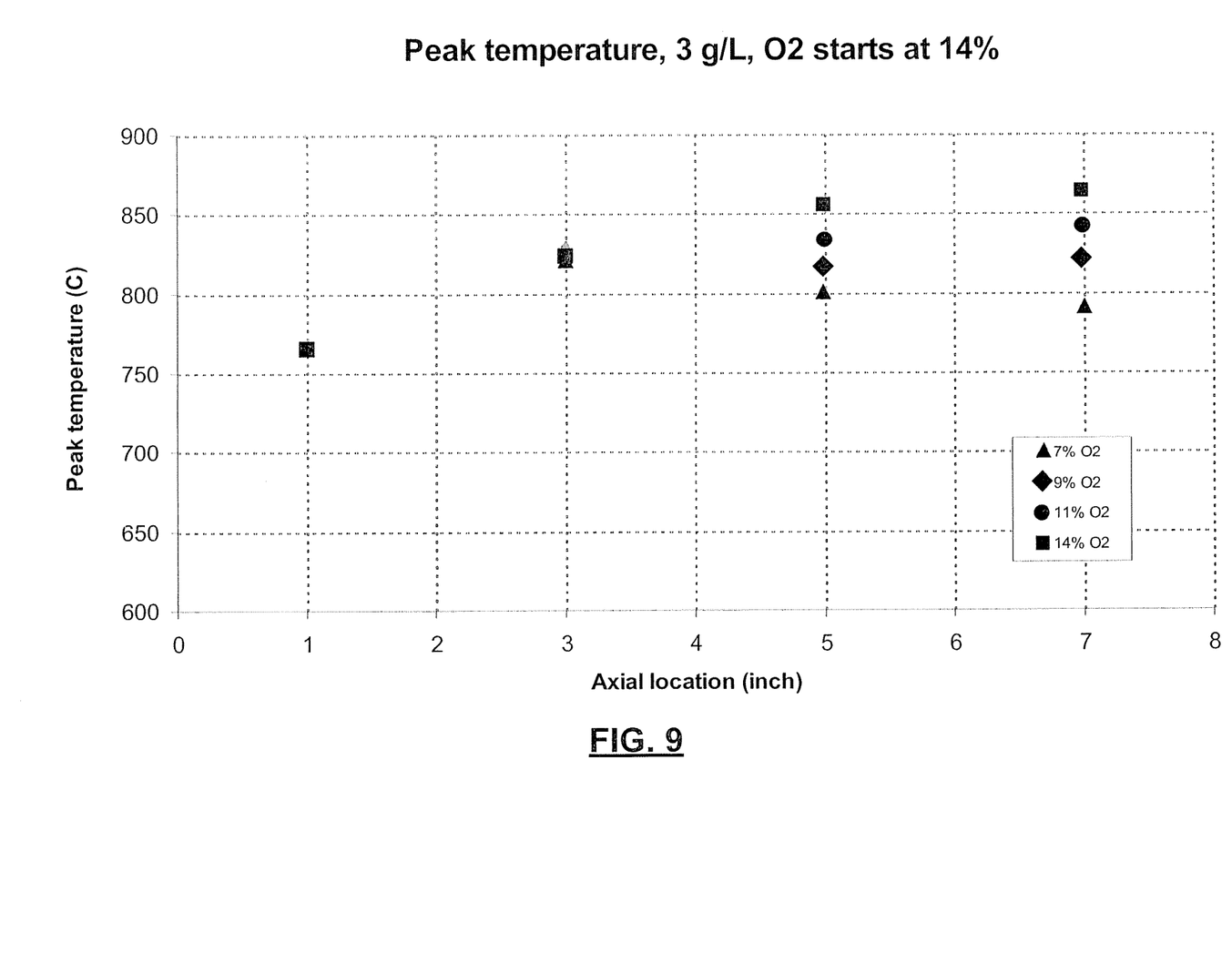
FIG. 9 is a graph illustration peak temperature as a function of axial location for various oxygen levels.

Referring now to FIG. 9, peak temperature is shown as a function of axial location for various oxygen levels (including 7% to 9% to 11% to 14%). The peak temperature of the different oxygen levels are initially similar. As the axial location increases, the temperatures diverge from each other. Lower oxygen levels tend to have lower peak temperatures. For the exemplary values of 7%, 9%, 11% and 14%, the temperature range at 7 inches is from approximately 790 degrees Celsius to 870 degrees Celsius. Therefore, a tradeoff can be made between soot reduction and peak temperature. As can be appreciated, the oxygen levels may be controlled (e.g. reduced) as the cascading flamefront nears sensitive components.

Figure 10:
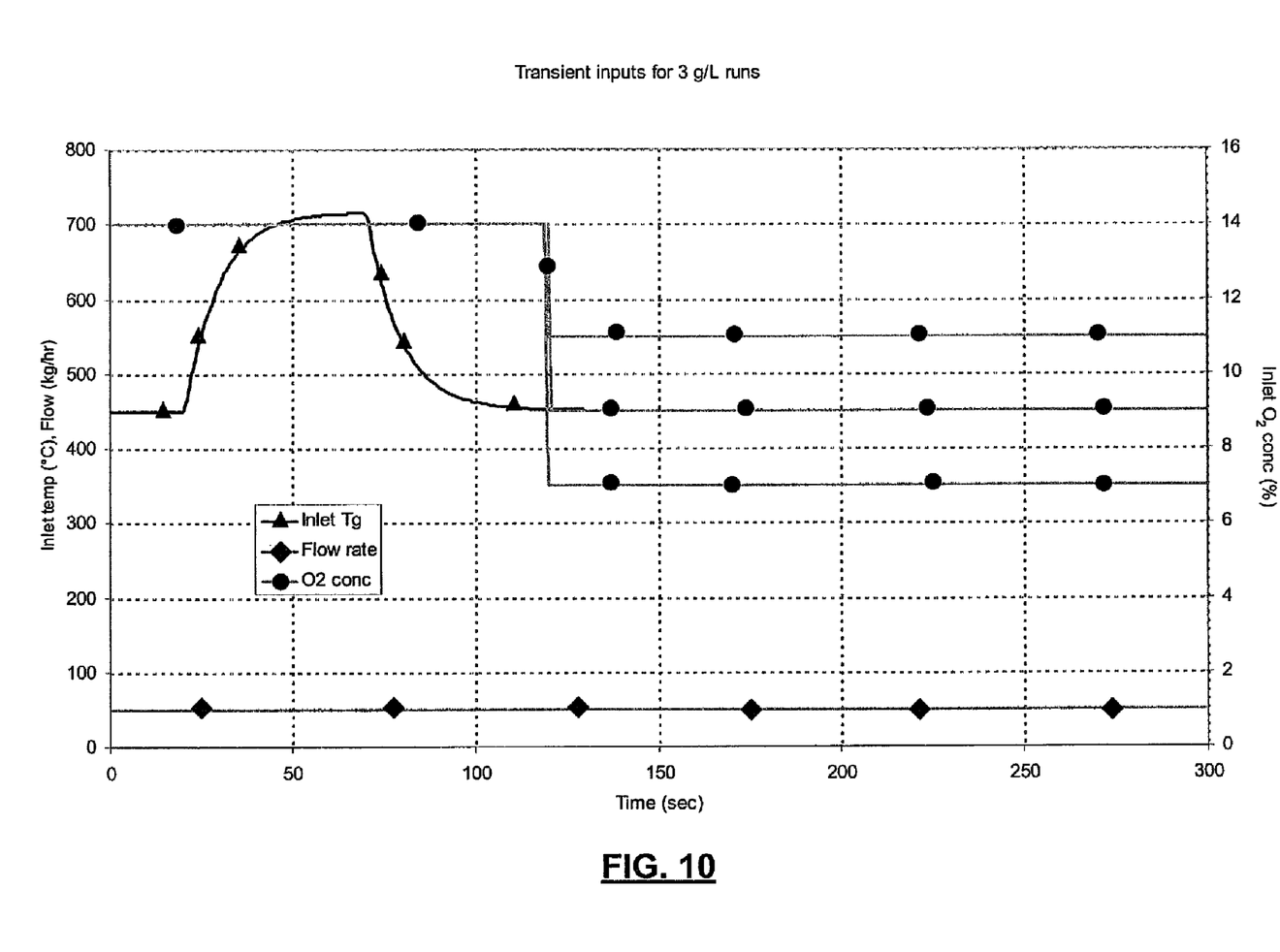
FIG. 10 is a graph illustrating adjustment of oxygen levels for a given flow rate.

Referring now to FIG. 10, oxygen levels of the exhaust gas can be adjusted during regeneration to change the resultant temperature of the cascading flamefront as it reaches the sensitive components of the PM filter. For example, the oxygen levels can be adjusted to reduce the likelihood that the flamefront will damage the rear end plugs of the PM filter. To that end, the oxygen levels may be set high initially to initiate heating of an upstream surface. After a predetermined period sufficient to allow the flamefront to reach the sensitive components, the oxygen level can be reduced to reduce a temperature of the burning soot.

Figure 11:
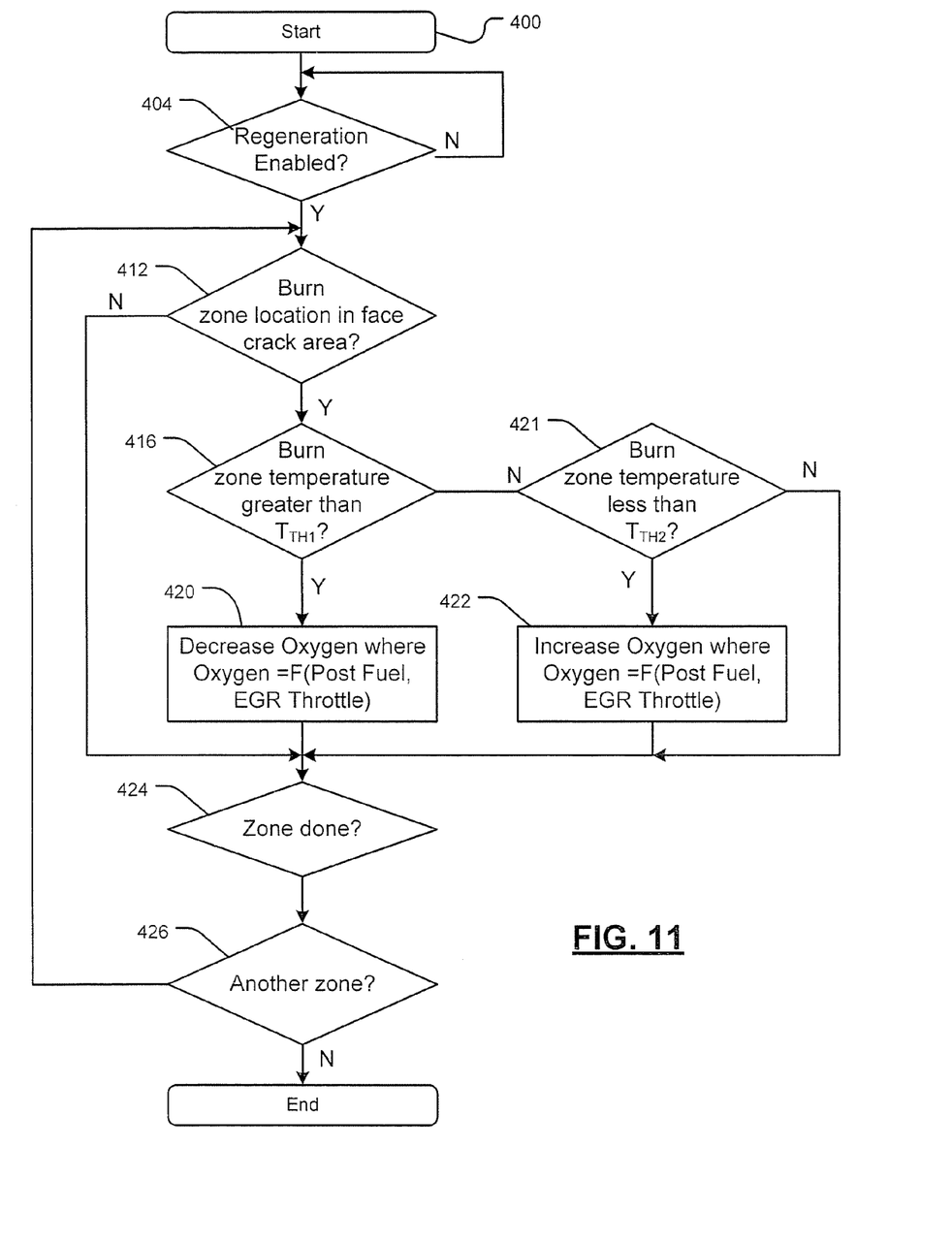
FIG. 11 is a flowchart illustrating steps of a method for controlling a temperature of a cascading flamefront to reduce combustion temperatures near components of the PM filter.

Referring now to FIG. 11, control begins with step 400. In step 404, control determines whether regeneration has been enabled. If step 404 is true, control continues with step 412 and determines whether the burn zone location is in a face crack area or other sensitive area. If step 412 is false, control returns to step 412. When step 412 is true, control continues with step 416 and determines whether the burn zone temperature will greater than a first predetermined temperature $T_{TH1}$ at a current oxygen level. The burn zone temperature may be measured or estimated. For example, the burn zone temperature may be estimated based on flow rates, oxygen levels in the exhaust stream and elapsed time since regeneration was started.

If step 416 is true, control decreases oxygen in the exhaust stream in step 420. The oxygen level in the exhaust can be adjusted using any suitable approach. For example only, the oxygen level in the exhaust can be adjusted using post fuel, exhaust gas regeneration (EGR), throttle or other suitable adjustments.

If step 416 is false, control continues with step 421 and determines whether the burn zone temperature will less than a second predetermined temperature $T_{TH2}$ at a current oxygen level. If true, control increases oxygen in the exhaust gas in step 422. Control continues from steps 420, 422 and 421 (if false) with step 424. In step 424, control determines whether the zone is done. If not, control returns to step 412. If step 424 is false, control continues with step 426, where control determines whether another zone needs to be regenerated. If step 426 is true, control returns to step 412. Otherwise control ends.

What is claimed is:

1. A system comprising:
   a particulate matter (PM) filter that comprises an upstream end for receiving exhaust gas, a downstream end, and a portion adjacent to said downstream end;
   a heater; and
   a control module that initiates combustion of PM in said PM filter using said heater, and that selectively adjusts oxygen levels of said exhaust gas based on a temperature of combustion within said portion of said PM filter to maintain said temperature of combustion within said portion of said PM filter at a desired temperature, wherein said desired temperature is less than a predetermined temperature for initiating regeneration of said PM filter.

2. The system of claim 1 wherein said heater comprises N zones, where N is an integer greater than one, wherein each of said N zones comprises M sub-zones, where M is an integer greater than one, and wherein said control module selectively activates at least a selected one of said N zones to initiate regeneration in downstream portions of said PM filter from said one of said N zones and deactivates non-selected ones of said N zones.

3. The system of claim 1 wherein said portion comprises a rear endplug of said PM filter.

4. The system of claim 2 wherein deactivating said non-selected ones of said N zones decreases thermal stress on said PM filter.

5. The system of claim 2 wherein said N zones are located in a center portion, a first circumferential portion radially outside of said center portion and a second circumferential portion radially outside of said first circumferential portion.

6. The system of claim 5 wherein said center portion comprises a first zone and said second circumferential portion comprises said first zone, a second zone and a third zone.

7. The system of claim 6 where said first, second and third zones alternate around said second circumferential portion.

8. The system of claim 6 wherein said first circumferential portion comprises fourth and fifth zones that alternate.

9. The system of claim 1 wherein said control module estimates a heating period to heat a face portion of said PM filter to a temperature greater than or equal to said predetermined temperature for initiating regeneration of said PM filter, and that shuts down said heater after said heating period.

10. The system of claim 9 wherein said control module estimates said heating period based on at least two of power supplied to said heater, exhaust flow, and exhaust temperature.

11. A method comprising:
    providing a particulate matter (PM) filter that comprises an upstream end for receiving exhaust gas, a downstream end, and a portion adjacent to said downstream end;
    initiating combustion of PM in said PM filter using a heater; and
    selectively adjusting oxygen levels of said exhaust gas based on a temperature of combustion within said portion of said PM filter to maintain said temperature of combustion within said portion of said PM filter at a desired temperature, wherein said desired temperature is less than a predetermined temperature for initiating regeneration of said PM filter.

12. The method of claim 11 wherein said heater is zoned and comprises N zones, where N is an integer greater than one, wherein each of said N zones comprises M sub-zones, where M is an integer greater than one, and further comprising:
    selectively activating at least a selected one of said N zones to initiate regeneration in downstream portions of said PM filter from said one of said N zones and deactivates non-selected ones of said N zones.

13. The method of claim 11 wherein said portion comprises a rear endplug of said PM filter.

14. The method of claim 12 wherein deactivating said non-selected ones of said N zones decreases thermal stress on said PM filter.

15. The method of claim 12 wherein said N zones are located in a center portion, a first circumferential portion radially outside of said center portion and a second circumferential portion radially outside of said first circumferential portion.

16. The method of claim 15 wherein said center portion comprises a first zone and said second circumferential portion comprises said first zone, a second zone and a third zone.

17. The method of claim 16 where said first, second and third zones alternate around said second circumferential portion.

18. The method of claim 16 wherein said first circumferential portion comprises fourth and fifth zones that alternate.

19. The method of claim 11 further comprising estimating a heating period to heat a face portion of said PM filter to a temperature greater than a predetermined temperature for initiating regeneration of said PM filter, and that shuts down said heater after said heating period.

20. The method of claim 19 further comprising estimating said heating period based on at least two of power supplied to said heater, exhaust flow, and exhaust temperature.

21. The system of claim 1, wherein said control module monitors a position of a flame front in said PM filter during regeneration of said PM filter, and wherein said control module adjusts said oxygen levels of said exhaust gas when said flame front has entered said portion of said PM filter.

22. The system of claim 1, wherein said control module adjusts oxygen levels of said exhaust gas to decrease said combustion temperature within said portion to said desired temperature by controlling at least one of (i) post-combustion fuel injection, (ii) exhaust gas recirculation (EGR), and (iii) a throttle.

23. The method of claim 11, further comprising monitoring a position of a flame front in said PM filter during regeneration of said PM filter, and wherein said oxygen levels of said exhaust gas are adjusted when said flame front has entered said portion of said PM filter.

24. The method of claim 11, wherein said oxygen levels of said exhaust gas are adjusted to decrease said combustion temperature within said portion to said desired temperature by controlling at least one of (i) post-combustion fuel injection, (ii) exhaust gas recirculation (EGR), and (iii) a throttle.

* * * * *